United States Patent [19]
Tea

[11] Patent Number: 5,805,059
[45] Date of Patent: Sep. 8, 1998

[54] VEHICLE OVERHEAT VOICE INDICATOR

[76] Inventor: Roger Tea, 14401 Huntridge Dr., Victorville, Calif. 92394

[21] Appl. No.: 883,565

[22] Filed: Jun. 26, 1997

[51] Int. Cl.$^6$ ...................................................... B60Q 5/00
[52] U.S. Cl. ........................................... 340/449; 340/438
[58] Field of Search .................................... 340/449, 460, 340/438

[56] References Cited

U.S. PATENT DOCUMENTS

| | | | |
|---|---|---|---|
| 3,631,388 | 12/1971 | Strong | 340/57 |
| 3,927,399 | 12/1975 | Fuzzell | 340/248 D |
| 4,359,714 | 11/1982 | Tsunoda et al. | 340/52 F |
| 4,940,964 | 7/1990 | Dao | 340/438 |
| 4,971,583 | 11/1990 | Umchara | 440/2 |
| 5,016,006 | 5/1991 | Umchara | 340/984 |

*Primary Examiner*—Ronald L. Biegel

[57] ABSTRACT

A voice playback temperature sensor is provided including a temperature sensor situated within an engine of a vehicle and adapted to transmit at an output thereof a voltage with a level directly proportional to a temperature within the engine of the vehicle. Further provided is a potentiometer having a first terminal connected to a constant voltage source, a second terminal connected to ground, and a third terminal. The potentiometer is adapted supply a user selected, adjustable voltage at the third terminal thereof. Also included is an operational amplifier having a positive terminal input connected to the output of the temperature sensor and a negative terminal input connected to the third terminal of the potentiometer. The operational amplifier is adapted to provide an activation signal at an output thereof upon the voltage at the positive terminal and the voltage at the negative terminal thereof differing by a predetermined amount. A non-retriggerable one-shot multivibrator is provided having an input connected to the output of operational amplifier for transmitting the activation for a predetermined fixed length of time upon at least the instantaneous receipt thereof from the operational amplifier. Finally, a voice play back mechanism is connected between a speaker and the multivibrator. The play back mechanism is adapted to recite a verbal warning via the speaker only during the receipt of the activation signal.

2 Claims, 1 Drawing Sheet

VEHICLE OVERHEAT VOICE INDICATOR

BACKGROUND OF THE INVENTION

1. Field of the Invention

The present invention relates to overheat indicators and more particularly pertains to a new vehicle overheat voice indicator for reciting a verbal indication to a user upon the temperature of a vehicle surpassing a user selected amount.

2. Description of the Prior Art

The use of overheat indicators is known in the prior art. More specifically, overheat indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art overheat indicators include U.S. Pat. No. 4,401,848; U.S. Pat. No. 4,771,390; U.S. Pat. No. 4,701,862; U.S. Pat. No. 4,071,839; U.S. Pat. No. 4,453,512; and U.S. Pat. No. Des. 291,195.

While these devices fulfill their respective, particular objectives and requirements, the aforementioned patents do not disclose a new vehicle overheat voice indicator. The inventive device includes means of allowing a user to adjust an engine temperature at which a vocal alarm sounds.

In these respects, the vehicle overheat voice indicator according to the present invention substantially departs from the conventional concepts and designs of the prior art, and in so doing provides an apparatus primarily developed for the purpose of reciting a verbal indication to a user upon the temperature of a vehicle surpassing a user selected amount.

SUMMARY OF THE INVENTION

In view of the foregoing disadvantages inherent in the known types of overheat indicators now present in the prior art, the present invention provides a new vehicle overheat voice indicator construction wherein the same can be utilized for reciting a verbal indication to a user upon the temperature of a Vehicle surpassing a user selected amount.

The general purpose of the present invention, which will be described subsequently in greater detail, is to provide a new vehicle overheat voice indicator apparatus and method which has many of the advantages of the overheat indicators mentioned heretofore and many novel features that result in a new vehicle overheat voice indicator which is not anticipated, rendered obvious, suggested, or even implied by any of the prior art overheat indicators, either alone or in any combination thereof.

To attain this, the present invention generally comprises a temperature sensor situated within an engine of a vehicle. The temperature sensor is adapted to transmit at an output thereof a voltage with a level directly proportional to a temperature within the engine of the vehicle. For affording a user control over the temperature at which the present invention actuates, a potentiometer is provided. The potentiometer has a first terminal connected to a constant voltage source and second terminal connected to ground. The potentiometer further has a third terminal whereat the potentiometer is adapted to supply a user selected, adjustable voltage. Further provided is an operational amplifier having a positive terminal input connected to the output of the temperature sensor and a negative terminal input connected to the third terminal of the potentiometer. In use, the operational amplifier serves to provide an activation signal at an output thereof upon the voltage at the positive terminal and the voltage at the negative terminal thereof differing by a predetermined amount. As such, the operational amplifier functions as a comparator. As can be seen in FIG. 1, a test switch is coupled between the constant voltage source and a resistor. Such resistor is in turn connected to ground. By this interconnection, the switch is adapted to transmit an activation signal upon the closing thereof. Further provided is an OR gate having a first input connected to the output of the operational amplifier and a second input connected between the test switch and the resistor. As is conventional of OR gates, it is adapted for transmitting the activation signal from an output thereof upon the receipt of the activation signal at least one of the inputs thereof. A non-retriggerable one-shot multivibrator is provided having an input connected to the output of the OR gate. Upon at least the instantaneous receipt of the activation signal from the OR gate, the multivibrator functions to transmit the activation signal at the output thereof for a predetermined fixed length of time. Finally, a voice play back mechanism is connected between a speaker and the multivibrator. In operation, the play back mechanism is adapted to recite a verbal warning via the speaker only during the receipt of the activation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new vehicle overheat voice indicator apparatus and method which has many of the advantages of the overheat indicators mentioned heretofore and many novel features that result in a new vehicle overheat voice indicator which is not anticipated, rendered obvious, suggested, or even implied by any of the prior art overheat indicators, either alone or in any combination thereof.

It is another object of the present invention to provide a new vehicle overheat voice indicator which may be easily and efficiently manufactured and marketed.

It is a further object of the present invention to provide a new vehicle overheat voice indicator which is of a durable and reliable construction.

An even further object of the present invention is to provide a new vehicle overheat voice indicator which is susceptible of a low cost of manufacture with regard to both materials and labor, and which accordingly is then susceptible of low prices of sale to the consuming public, thereby making such vehicle overheat voice indicator economically available to the buying public.

Still yet another object of the present invention is to provide a new vehicle overheat voice indicator which provides in the apparatuses and methods of the prior art some of the advantages thereof, while simultaneously overcoming some of the disadvantages normally associated therewith.

Still another object of the present invention is to provide a new veicle overheat voice indicator for reciting a verbal indication to a user upon the temperature of a vehicle surpassing a user selected amount.

Even still another object of the present invention is to provide a new vehicle overheat voice indicator that includes a temperature sensor situated within an engine of a vehicle and adapted to transmit at an output thereof a voltage with a level directly proportional to a temperature within the engine of the vehicle. Further provided is a potentiometer having a first terminal connected to a constant voltage source, a second terminal connected to ground, and a third terminal. The potentiometer is adapted supply a user selected, adjustable voltage at the third terminal thereof. Also included is an operational amplifier having a positive terminal input connected to the output of the temperature sensor and a negative terminal input connected to the third terminal of the potentiometer. The operational amplifier is adapted to provide an activation signal at an output thereof upon the voltage at the positive terminal and the voltage at the negative terminal thereof differing by a predetermined amount. A non-retriggerable one-shot multivibrator is provided having an input connected to the output of operational amplifier for transmitting the activation for a predetermined fixed length of time upon at least the instantaneous receipt thereof from the operational amplifier. Finally, a voice play back mechanism is connected between a speaker and the multivibrator. The play back mechanism is adapted to recite a verbal warning via the speaker only during the receipt of the activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
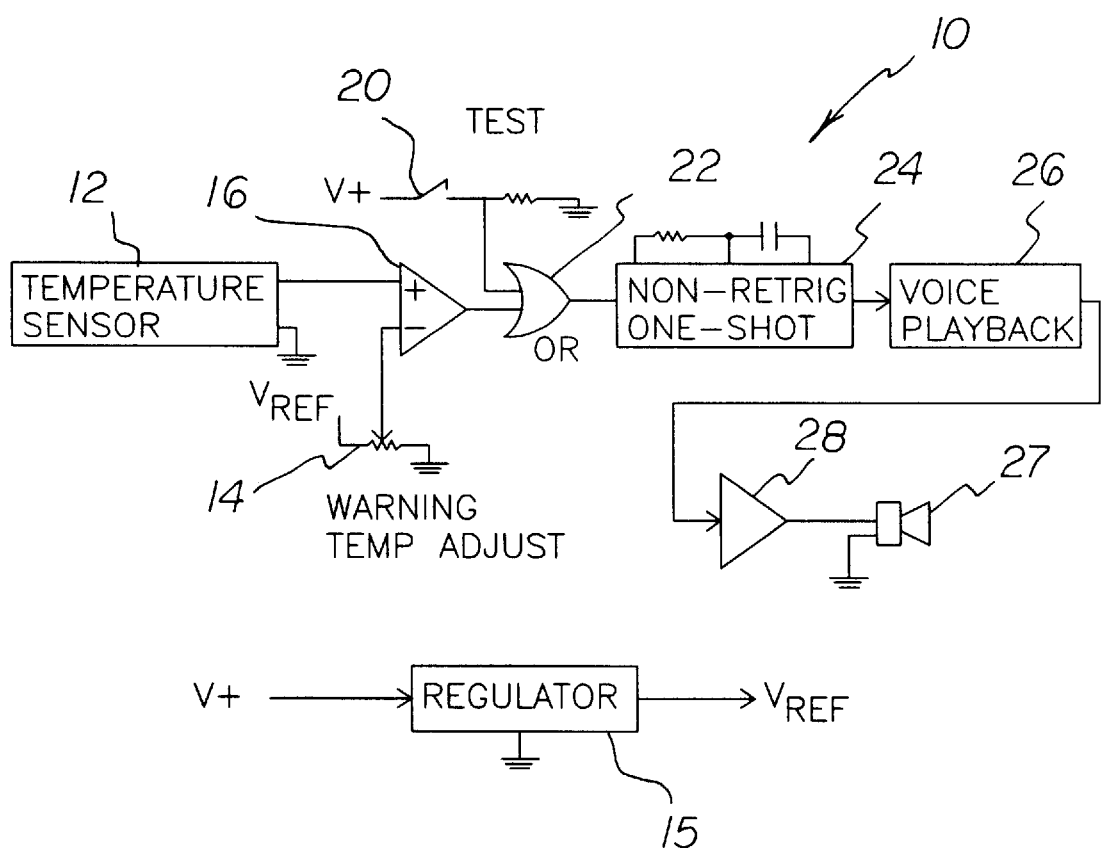
FIG. 1 is a schematic diagram of a new vehicle overheat voice indicator according to the present invention.

With reference now to the drawings, a new vehicle overheat voice indicator embodying the principles and concepts of the present invention and generally designated by the reference numeral 10 will be described.

Specifically, the system 10 of the present invention includes a temperature sensor 12 situated within an engine of a vehicle. The temperature sensor is adapted to transmit at an output thereof a voltage with a level directly proportional to a temperature within the engine of the vehicle. As such, the voltage is always a constant function of the temperature. Preferably, the temperature sensor is positioned at a location in the engine whereat it detects the temperature level of the coolant of the vehicle.

For affording a user control over the temperature at which the present invention actuates, a potentiometer 14 is provided. The potentiometer has a first terminal connected to a constant voltage source and second terminal connected to ground. As shown in the FIGURE, a voltage regulator 15 is provided to ensure that the voltage supplied to the potentiometer remains constant. The potentiometer further has a third terminal whereat the potentiometer is adapted to supply a user selected, adjustable voltage. While not shown, it is preferred that the potentiometer has associated therewith a dial readily accessible to the user for selectively determining the adjustable voltage.

Further provided is an operational amplifier 16 having a positive terminal input connected to the output of the temperature sensor and a negative terminal input connected to the third terminal of the potentiometer. In use, the operational amplifier serves to provide an activation signal at an output thereof upon the voltage at the positive terminal and the voltage at the negative terminal thereof differing by a predetermined amount. As such, the operational amplifier functions as a comparator.

As can be seen in FIG. 1, a test switch 20 is coupled between the constant voltage source and a resistor. Such resistor is in turn connected to ground. By this interconnection, the switch is adapted to transmit an activation signal upon the closing thereof. Similar to the dial of the potentiometer, it is preferred that the test switch be readily accessible to the user.

Further provided is an OR 22 gate having a first input connected to the output of the operational amplifier and a second input connected between the test switch and the resistor. As is conventional of OR gates, it is adapted for transmitting the activation signal from an output thereof upon the receipt of the activation signal at least one of the inputs thereof.

A non-retriggerable one-shot multivibrator 24 is provided having an input connected to the output of the OR gate. Upon at least the instantaneous receipt of the activation signal from the OR gate, the multivibrator functions to transmit the activation signal at the output thereof for a predetermined fixed length of time.

Finally, a voice play back mechanism 26 is connected between a speaker 27 and the multivibrator. In operation, the play back mechanism is adapted to recite a verbal warning via the speaker only during the receipt of the activation signal. For providing ample amplification of the verbal warning, an audio amplifier 28 is ideally coupled between the voice play back mechanism and the speaker. Such verbal warning preferably consists of the phrase "engine is overheating." It should be noted that the present invention is preferably utilized in conjunction with a conventional vehicle overheat lamp of the vehicle. This permits the simultaneous actuation of the voice playback with the illumination of the lamp.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A voice playback temperature sensor comprising, in combination:

a temperature sensor situated within an engine of a vehicle and adapted to transmit at an output thereof a voltage with a level directly proportional to a temperature within the engine of the vehicle;

a potentiometer having a first terminal connected to a constant voltage source, a second terminal connected to ground, and a third terminal, the potentiometer adapted supply a user selected, adjustable voltage at the third terminal thereof;

an operational amplifier having a positive terminal input connected to the output of the temperature sensor and a negative terminal input connected to the third terminal of the potentiometer, the operational amplifier adapted to provide an activation signal at an output thereof upon the voltage at the positive terminal and the voltage at the negative terminal thereof differing by a predetermined amount;

a test switch coupled between the constant voltage source and a resistor which is in turn connected to ground, the switch adapted to transmit an activation signal upon the closing thereof;

an OR gate having a first input connected to the output of the operational amplifier and a second input connected between the test switch and the resistor for transmitting the activation signal from an output thereof upon the receipt of the activation signal at least one of the inputs thereof;

a non-retriggerable one-shot multivibrator having an input connected to the output of the OR gate for transmitting the activation signal at the output thereof for transmitting the activation signal for a predetermined fixed length of time upon at least the instantaneous receipt thereof from the OR gate; and a voice play back mechanism connected between a speaker and the multivibrator, the play back mechanism adapted to recite a verbal warning via the speaker only during the receipt of the activation signal.

2. A voice playback temperature sensor comprising:

a temperature sensor situated within an engine of a vehicle and adapted to transmit at an output thereof a voltage with a level directly proportional to a temperature within the engine of the vehicle;

a potentiometer having a first terminal connected to a constant voltage source, a second terminal connected to ground, and a third terminal, the potentiometer adapted supply a user selected, adjustable voltage at the third terminal thereof;

an operational amplifier having a positive terminal input connected to the output of the temperature sensor and a negative terminal input connected to the third terminal of the potentiometer, the operational amplifier adapted to provide an activation signal at an output thereof upon the voltage at the positive terminal and the voltage at the negative terminal thereof differing by a predetermined amount;

a non-retriggerable one-shot multivibrator having an input connected to the output of operational amplifier for transmitting the activation signal for a predetermined fixed length of time upon at least the instantaneous receipt thereof from the operational amplifier; and a voice play back mechanism connected between a speaker and the multivibrator, the play back mechanism adapted to recite a verbal warning via the speaker only during the receipt of the activation signal.

* * * * *